United States Patent
Pal et al.

(10) Patent No.: US 12,197,374 B2
(45) Date of Patent: Jan. 14, 2025

(54) PEER-TO-PEER LINK SHARING FOR UPSTREAM COMMUNICATIONS FROM XPUS TO A HOST PROCESSOR

(71) Applicant: Intel Corporation, Santa Clara, CA (US)

(72) Inventors: Rahul Pal, Bangalore (IN); Nayan Amrutlal Suthar, Bangalore (IN); David M. Puffer, Tempe, AZ (US); Ashok Jagannathan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 634 days.

(21) Appl. No.: 17/359,321

(22) Filed: Jun. 25, 2021

(65) Prior Publication Data

US 2021/0318980 A1  Oct. 14, 2021

(51) Int. Cl.
*G06F 13/42* (2006.01)
*G06F 12/0815* (2016.01)
*G06T 1/20* (2006.01)

(52) U.S. Cl.
CPC ...... *G06F 13/4221* (2013.01); *G06F 12/0815* (2013.01); *G06T 1/20* (2013.01); *G06F 2213/0026* (2013.01)

(58) Field of Classification Search
CPC ............. G06F 13/4221; G06F 12/0815; G06F 2213/0026; G06T 1/20
See application file for complete search history.

(56) References Cited

U.S. PATENT DOCUMENTS

| | | | |
|---|---|---|---|
| 10,990,562 B2 * | 4/2021 | Butcher | G06F 13/4022 |
| 11,947,472 B2 * | 4/2024 | Shah | G06F 12/0813 |
| 2009/0198956 A1 * | 8/2009 | Arimilli | H04L 45/12 |
| | | | 712/E9.001 |
| 2018/0143932 A1 | 5/2018 | Lawless et al. | |
| 2018/0167310 A1 * | 6/2018 | Kamble | H04L 45/125 |
| 2019/0050365 A1 * | 2/2019 | Kopzon | G06F 13/4282 |
| 2020/0097421 A1 * | 3/2020 | Le | G06F 1/12 |
| 2020/0192798 A1 | 6/2020 | Natu | |
| 2020/0327084 A1 | 10/2020 | Choudhary et al. | |
| 2020/0379930 A1 | 12/2020 | Brownell et al. | |

OTHER PUBLICATIONS

EPO; Extended European Search Report issued in EP Patent Application No. 22165672.1, dated Sep. 28, 2022; 9 pages.
Compute Express Link, "Specification—Oct. 2020, Revision 2.0", 628 pages.
Office Action for European Patent Application No. 22165672.1, mailed on Jul. 26, 2023.

* cited by examiner

*Primary Examiner* — Nimesh G Patel
(74) *Attorney, Agent, or Firm* — Alliance IP, LLC

(57) ABSTRACT

A processor unit comprising a first controller to couple to a host processing unit over a first link; a second controller to couple to a second processor unit over a second link, wherein the second processor unit is to couple to the host central processing unit via a third link; and circuitry to determine whether to send a cache coherent request to the host central processing unit over the first link or over the second link via the second processing unit.

20 Claims, 7 Drawing Sheets

| BANDWIDTH TELEMETRY STATISTIC VALUE | | | SEND HOST BOUND TRAFFIC VIA PEER? |
|---|---|---|---|
| OWN UPSTREAM AVAILABLE BW | PEER-TO-PEER LINK AVAILABLE BW | PEER'S UPSTREAM AVAILABLE BW | |
| HIGH | X | X | NO |
| LOW | HIGH | HIGH | YES, AT REASONABLE RATE |
| LOW | LOW | X | VERY LOW RATE |
| LOW | X | LOW | VERY LOW RATE |

PEER-TO-PEER LINK SHARING FOR UPSTREAM COMMUNICATIONS FROM XPUS TO A HOST PROCESSOR

FIELD

The present disclosure relates in general to the field of computer development, and more specifically, to peer-to-peer link sharing for upstream communications from processor units (XPUs) to a host processor.

BACKGROUND

Host, memory, and processor unit (XPU) disaggregation across multiple servers is a way of building systems to deliver high performance in a cost-effective and power-efficient manner.

BRIEF DESCRIPTION OF THE DRAWINGS

FIG. 4 is a chart for determining when to enable peer-to-peer link sharing for upstream communications from and XPU to a host processor in accordance with various embodiments.

Like reference numbers and designations in the various drawings indicate like elements.

DETAILED DESCRIPTION

Figure 1:
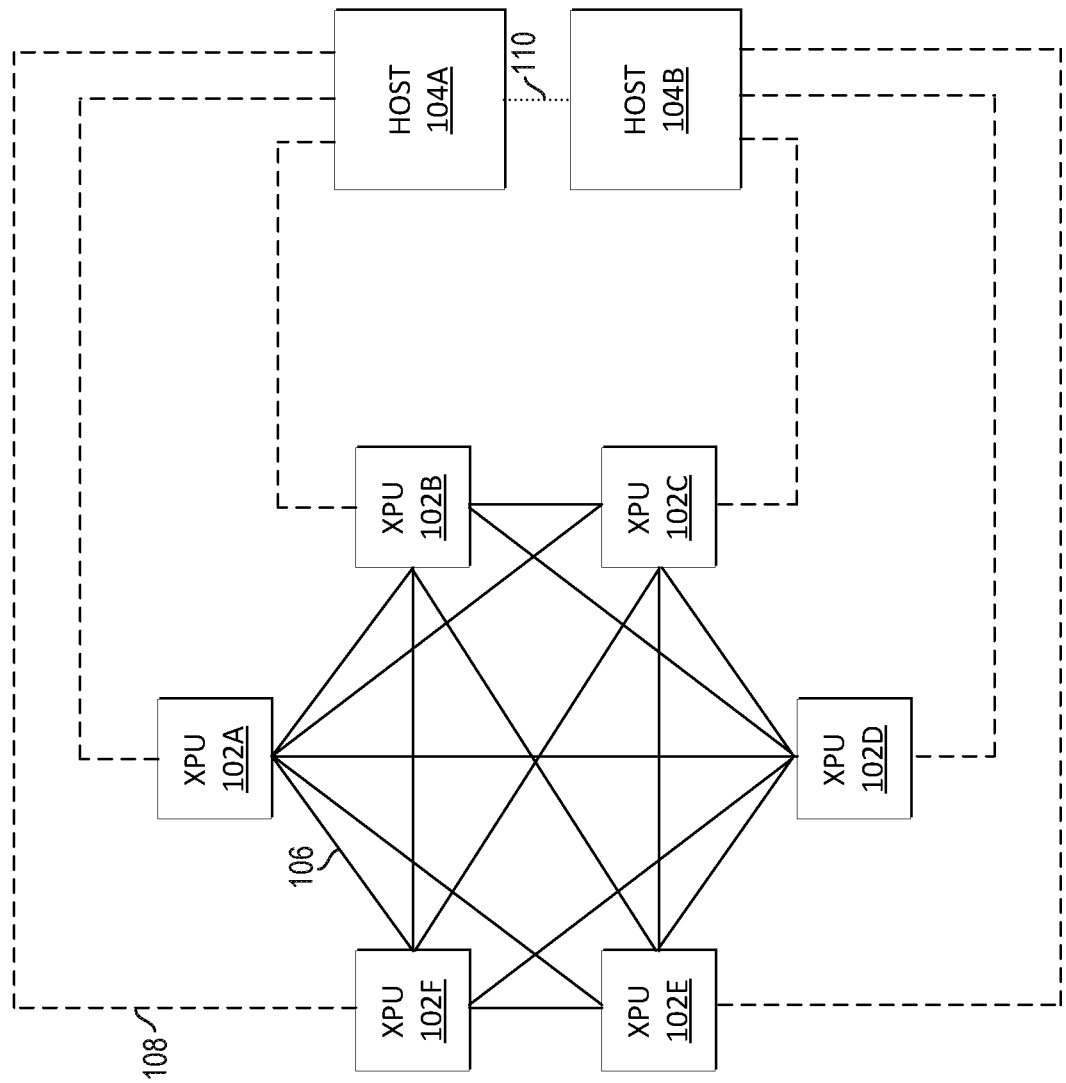
FIG. 1 is a block diagram of a computing system for peer-to-peer link sharing for upstream communications from processor units (XPUs) to a host processor in accordance with various embodiments.

FIG. 1 is a block diagram of a computing system 100 for peer-to-peer link sharing for upstream communications from processor units (XPUs) 102 (e.g., 102A to 102F) to a host (104A or 104B) comprising a processor (e.g., a CPU) in accordance with various embodiments. In the embodiment depicted, each XPU 102 is coupled to each other XPU 102 via peer-to-peer links 106. XPUs 102 also each couple to a host 104A or 104B through a respective host link 108. In the embodiment depicted, XPUs 102A, 102B, and 102F each connect to host 104A via a respective host link 108 and XPUs 102C, 102D, and 102E each connect to host 104B via a respective host link 108. Any other suitable connectivity arrangements are contemplated in various embodiments, such as one or more XPUs only connected to a subset of the other XPUs, one or more XPUs not connected to any hosts 104, each XPU having a dedicated link 108 to each host 104, multiple links (e.g., 106, 108) between any components, or other suitable connectivity. The hosts 104A and 104B may also be connected to each other via link 110. In some embodiment, system 100 is a cache coherent system providing for uniformity of shared data across the XPUs 102 and one or more hosts 104, where the data may be stored in multiple local caches of the XPUs and/or hosts 104.

XPU deployments in various environments (e.g., datacenters) for segments such as artificial intelligence (AI) training and high performance computing (HPC) (among others) may include multi-XPU scale up systems (such as system 100) where each host processor (e.g., central processing unit (CPU)) may host multiple XPU devices which also are directly attached to each other on their own scaleup network.

In segments (e.g., HPC) where the workload has a fair amount of computation on both the processor (e.g., CPU) of a host (e.g., 104) and an XPU cluster (e.g., XPUs 102) and there is significant shared memory access, a higher link bandwidth between the XPU cluster and the host processor is advantageous. Access of such shared memory that is resident on the host 104 (or otherwise accessible through the host) might be bursty across XPUs 102, such that utilization of a link to the host (e.g., host link 108) by an XPU 102 at any point of time may be quite different from the utilization of a link to the host by another XPU.

Various embodiments of the present disclosure provide the ability for XPUs 102 in a multi-XPU scale up system to share upstream bandwidth to a host 104 in order to achieve higher average upstream bandwidth to memory of the host 104. For example, some embodiments allow an XPU 102 to access host memory via a peer XPU's upstream link to the host 104 in addition to its own. An XPU 102 may share its upstream bandwidth to the host 104 with more than one peer XPU. Various embodiments may allow an XPU 102 to determine when to opportunistically leverage the upstream bandwidth of one or more of its peer XPUs to make efficient use of the available bandwidth. Various embodiments allow XPUs that are part of a scale up cluster the ability to dynamically borrow and achieve higher bandwidth towards host processor memory, especially when such access is bursty in nature. Various embodiments may provide particular benefit in use cases such as HPC in which there is frequent graphics processing unit (GPU) (where a GPU is one example of an XPU) and CPU interaction through shared memory and in which the memory footprint is generally higher in the memory of the host 104 than the memory of the individual XPUs 102.

A processor unit 102 may comprise any suitable processing or storage device, such as a hardware accelerator, GPU, field programmable gate array, neural network processing unit, artificial intelligence processing unit, inference engine, data processing unit, or infrastructure processing unit, I/O device, or other suitable computing device capable of communicating with other XPUs 102 and one or more hosts 104.

A host 104 may comprise any electronic device capable of performing computing operations (e.g., processing or storage operations) and communicating over a link with one or more XPUs 102. In various embodiments, a host 104 may comprise a processor, such as a CPU or other processor unit. In some embodiments, a computing device may also comprise supporting architecture, such as BIOS, memory, or I/O services. In some embodiments, a host 104 may comprise a server.

A host link 108 may comprise a link according to any suitable protocol that enables communication between an XPU 102 and a host 104. A link may refer to a logical connection between computing devices and may be defined in terms of number of lanes (such as 16, 8, or 4; denoted as ×16, ×8, or ×4). In some embodiments, each lane may comprise a transmit path and a receive path (with each path comprising a unidirectional differential pair). Other embodiments may have other arrangements.

In various embodiments, the host link 108 is a Peripheral Component Interconnect Express (PCIe) link (e.g., as defined in the PCIe 5.0 base specification or other suitable PCIe specification). In various embodiments, the host link 108 may be a link that enables cache coherency between a host 104. For example, in some embodiments, the host link 108 is a Compute Express Link™ (CXL) (e.g., as defined in the CXL 2.0 Specification or other suitable CXL specification). CXL is a protocol for a connection between a device (e.g., XPU 102) and processor (e.g., CPU) of a host 104 over a PCIe link. CXL provides the benefit of shared coherent cacheable memory between device (e.g., XPU 102) and host (e.g., 104). In one implementation, bandwidth achieved on a CXL link is similar to that achievable on a PCIe link (e.g., 64 GBps on a ×16 Gen5 phy).

Traffic sent by an XPU 102 to the host 104 over CXL may be sent using either the CXL.cache channel or the CXL.io channel. CXL.cache traffic allows for coherent cacheable semantics (providing for coherency among the memories of the host 104 and the XPUs 102), while CXL.io uses regular PCIe semantics to provide a non-coherent load/store interface for devices. The host 104 may also communicate with its memory using a third channel (CXL.mem) using memory semantics. In various embodiments, the upstream traffic that is sent from an XPU 102 to a host 104 (whether directly through the XPU 102's host link 108 or through another XPU) comprises cache coherency transactions, such as reads of or writes to memory of the host 104. The CXL.cache protocol (or other link protocol) may define interactions between an XPU 102 and host 104 as a number of requests that each have at least one associated response message and sometimes a data transfer (e.g., a memory line of data such as 64 bytes).

A peer-to-peer link 106 may also comprise a link according to any suitable protocol that enables communication between peer XPUs 102. In various embodiments, the peer-to-peer links 106 also support cache coherency among the XPUs 102. In some embodiments, the peer-to-peer links 106 are a high bandwidth scaleup link such as INTEL® $X^e$ Link or NVIDIA® NVLink®. This link 106 may include high bandwidth SERDES options along with high bandwidth communication between peer XPUs through natively wide links or multiple links that may be ganged.

Figure 2:
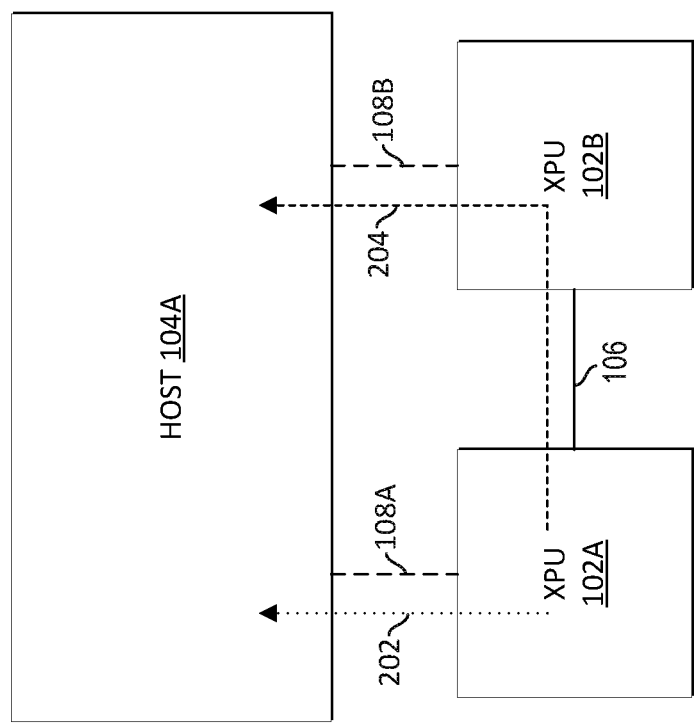
FIG. 2 is a block diagram that shows upstream communications in accordance with various embodiments.

FIG. 2 is a block diagram that shows upstream communications in accordance with various embodiments. The diagram depicts an XPU 102A that sends upstream communications to a host 104A. XPU 102A is coupled to host 104A via host link 108A and to peer XPU 102B via peer-to-peer link 106. XPU 102B is coupled to host 104A via host link 108B.

XPU 102A may normally send communications (e.g., requests to write or read memory controlled by the host 104A such as CXL.cache traffic) to host 104A via datapath 202 through host link 108A. However, in the embodiment depicted, XPU 102A may also send such communications to host 104A through datapath 204, which includes the peer-to-peer link 106 and the peer XPU's host link 108B. Thus, XPU 102A may send a communication to host 104A via peer-to-peer link 106 and the peer XPU 102B may provide the communication to host 104A via host link 108B.

Figure 3:
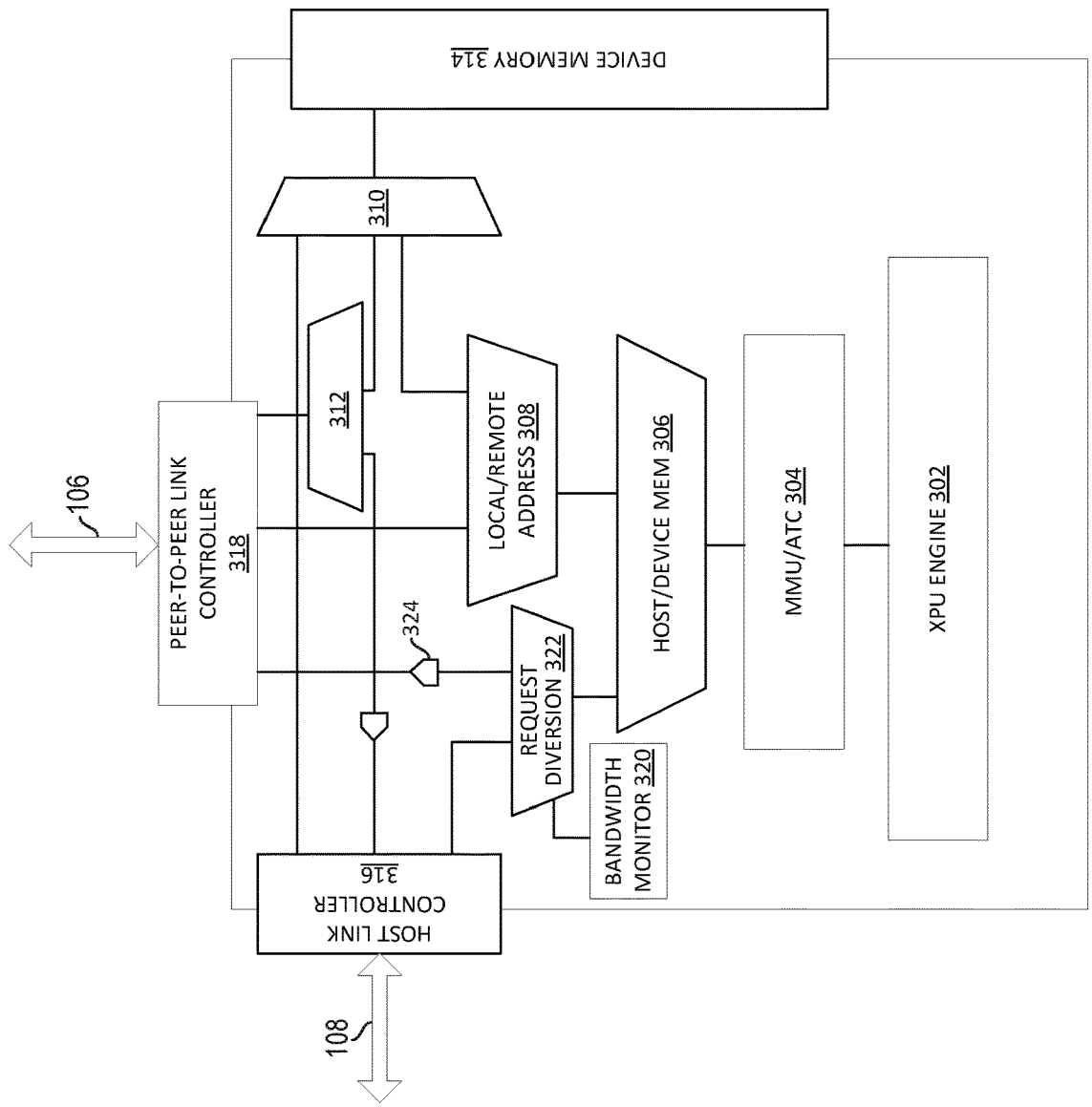
FIG. 3 is a block diagram of an architecture of an XPU in accordance with various embodiments.

FIG. 3 is a block diagram of an architecture 300 of an XPU 102 in accordance with various embodiments. In various embodiments, each XPU 102 in system 100 may have some or all of the components depicted. In a scale up system, (e.g., as illustrated in FIG. 1), each XPU 102 may access three different types of system memory components via three different datapaths. First, an XPU 102 may access its own local memory (e.g., device memory 314 or other local memory coupled to the XPU 102) via an internal memory fabric. Second, an XPU 102 may access a peer XPU's memory (e.g., the peer XPU's device memory 314) via a peer-to-peer link 106. Finally, an XPU 102 may access memory of a host 104 (e.g., memory resident on the host 104 or other memory accessible via the host 104) via a host link 108.

The device memory 314 or the memory of the host 104 may be any suitable type of memory such as double data rate (DDR), low-power double data rate (LPDDR), high bandwidth memory (HBM), or other suitable memory. In some embodiments, a high bandwidth network on chip (NoC) on the XPU 102 may allow the XPU 102 to achieve a desired memory bandwidth. In various embodiments, the device memory 314 may be centralized or distributed across the XPU 102.

An XPU engine 302 may generate a cache coherent request (e.g., a request to read memory or write to memory in an address space of the system 100 in a cache coherent manner). In some embodiments, the XPU engine 302 may execute a thread that accesses memory and the request may be generated responsive to the thread. The request may be passed to memory management unit (MMU) 304. The MMU 304 may manage memory owned by the XPU 102. Memory management unit (MMU) 304 may perform logical-to-physical address translation for the requests. If the MMU 304 is unable to perform an address translation (e.g., because the memory is located at the host 104), the XPU 102 may send an address translation request to an entity (e.g., an IOMMU of the host 104) and receive the physical address in response. The MMU 304 may also include or be coupled to an address translation cache (ATC), which may cache logical-to-physical address translations received by the XPU 102 (e.g., in a manner similar to a translation lookaside buffer).

The host/device memory demultiplexer (demux) 306 may determine where the requested memory is located and route the request accordingly. If the memory is located within (or otherwise owned by) the XPU 102 or a peer XPU, the request is routed to the local/remote address demux 308. The local/remote address demux 308 determines (e.g., through a range comparison) whether the memory is local to the XPU 102 or owned by a peer XPU. If the memory is local to the XPU 102, the request is then routed through multiplexer (mux) 310 to the device memory 314. If the memory is owned by a peer XPU, then the request is routed by local/remote address demux 308 to peer-to-peer link controller 318 and through peer-to-peer link 106 to the peer XPU. Mux 310 also routes memory requests received over peer-to-peer link 106 from a peer XPU and memory requests from host 104 received over link 108 to the device memory 314.

To enable an XPU 102 to borrow into the larger pool of aggregate upstream bandwidth to a host 104 available to the XPU scale cluster (via host links 108 of other XPUs), the architecture 300 of an XPU 102 includes a path allowing conditional diversion of outbound traffic destined for the host 104 (e.g., memory requests such as CXL.cache traffic) to the peer-to-peer link controller 318 and peer-to-peer link 106 (for transmission to the host through a peer XPU). The architecture 300 also includes a path allowing conditional diversion of inbound traffic from the peer-to-peer link 106 and peer-to-peer link controller 318 towards the host link controller 316 and host link 108 (e.g., when the XPU is relaying traffic to the host 104 for another XPU). This path may cross through demux 312 and may be tagged with tag 326.

The controllers 316 and 318 may include any suitable circuitry to setup and control the communication over the respective links. In some embodiments, the host link controller 316 may comprise a CXL.cache controller.

Requests generated by XPU engine 302 that are destined for the host 104 may pass through request diversion circuitry 322. Under normal conditions (e.g., when the host link 108 has ample available bandwidth), upstream requests to the host 104 may be sent from the request diversion circuitry 322 to the host link controller 316 and through the host link 108 to the host 104. In some situations when the available upstream bandwidth on link 108 is low, traffic destined for the host 104 may be sent through another XPU and thus the traffic may be sent by the request diversion circuitry 322 to the peer-to-peer link controller 318 and a tag 324 may be applied to the traffic to indicate that the traffic is host-bound. In various embodiments, the decision made by request diversion circuitry 322 on whether to route upstream traffic to the host link 108 or to a peer-to-peer link 106 may be based on available upstream bandwidth information tracked by bandwidth monitor 320. Further details on such decisions are described below.

A peer XPU that receives traffic from another XPU on one of its peer-to-peer links 106 may check (e.g., using demux 312) the traffic to determine if it is host-bound (e.g., whether it has a host-bound tag 324). If the tag is set, then the peer XPU may send this inbound traffic towards its own host link 108 (rather than sending it to its device memory 314 as it would for standard requests received via link 106 from another XPU) to the host 104. If the tag is not set, then the XPU may determine that the request is a request from a peer XPU for a portion of its memory and sends the request to device memory 314.

The XPUs 102 may support any relevant protocol conversions or tunneling to enable the host-bound requests to be sent over the peer-to-peer links 106. In various embodiments, the protocol (e.g., CXL.cache) used to communicate host-bound traffic may be source-ordered, thus enabling the flows described herein without introducing additional ordering requirements over the peer-to-peer link 106.

Various embodiments may include any suitable circuitry to enable coherent semantics in system 100. For example, a host 104 may include a snoop filter to track possible caching by XPUs 102 of memory lines from the memory of the host 104. For example, the snoop filter of the host 104 may track memory accesses to determine whether memory has been modified or in order to notify devices when cached memory should be invalidated (e.g., because it was modified by the host 104 or another XPU 102).

As described above, the traffic to the host 104 (e.g., CXL.cache traffic) may be source ordered. In various embodiments, the host's snoop filter tracks caching per host link 108 connected to the host 104 (e.g., the CXL 2.0 specification only allows one CXL.cache enabled device per link). Thus, a cacheable request from an XPU 102 will be tagged by the host's snoop filter as being cached behind the link over which the request was received. Accordingly, the host's snoop filter may not distinguish which XPU 102 has cached a memory line, but rather may track only the particular host link 108 over which the request for the memory line was received. Thus, if a request is received from an XPU through another XPU, the host's snoop filter may not be able to tell which XPU has cached the memory line identified in the request.

As the host's snoop filter tracks caching per host link 108, any later snoops from the host that are a consequence of a cacheable request sent by an XPU via a peer XPU will be sent by the host over the peer XPU's host link 108. In various embodiments, such snoops may be handled based on the caching model that the XPU uses for memory of the host 104.

In some embodiments, an XPU's cache for memory accessed from the host 104 is disposed near the host link controller 316 (this is sometimes referred to as a shallow caching model). For example, this kind of caching may be used for popular use cases like in-place device atomics support for system memory (e.g., where an XPU uses cacheable semantics primarily for exciting atomic ops while using non-cacheable/ReadCurrent semantics for other requests). In this case, all memory access requests (e.g., CXL.cache requests) sent over the host link 108 by an XPU (including those it sends on behalf of a peer XPU) are cached at this XPU. In this case, the XPU itself may service all the snoops it receives over the host link from host. In some embodiments, an XPU responds to a snoop by indicating the state of the memory line in the XPU's cache and/or may indicate that data is being returned to the host 104 to the provided data buffer.

In various embodiments, the cache for memory accessed from the host 104 is disposed deeper within the XPU (e.g., the cache may be in other device memory, which could include memory of the peer XPU). In such cases, when an XPU receives a snoop over its host link 108, the XPU may determine whether the memory line is cached by itself or a peer XPU. In various embodiments, the XPU may maintain a snoop filter (e.g., near the host link 108) that tracks any cacheable access that a peer XPU might have made to the host 104 over this host link. If this snoop filter indicates that a particular snoop from the host 104 needs to be sent to the peer XPU (e.g., because the peer XPU has cached the memory), the XPU converts the snoop from the host to the snoop semantics used over the peer-to-peer link to send to the peer XPU (e.g., similar to the semantics the XPU may use with respect to snoops associated with its own memory cached by a peer XPU).

FIG. 4 depicts a chart 400 for determining when to enable peer-to-peer link sharing for upstream communications from an XPU 102 to a host 104 in accordance with various embodiments. As described earlier, request diversion circuitry 322 may determine whether an XPU's request to a host 104 should be sent via the XPU's own host link 108 or via its peer-to-peer link 106 to the host 104 through another XPU.

In various embodiments, this decision may be based on one or more measures of bandwidth availability tracked by bandwidth monitor 320. The measures of bandwidth availability that may influence the decision of whether to send a host-bound request through a peer XPU may include one or more of bandwidth availability on the XPU's host link 108, bandwidth availability on the peer-to-peer link 106 to a peer XPU, and bandwidth availability on the peer XPU's host link 108.

In various embodiments, the determination of bandwidth availability on an XPU's own host link 108 may be based on raw bandwidth utilization in the upstream direction over the host link 108. For example, the bandwidth monitor 320 may determine bandwidth utilization at a particular point of time, average bandwidth utilization over a period of time, or other raw bandwidth utilization metric based on a number of observed requests and/or size of requests. In some embodiments, the bandwidth availability on the XPU's host link 108 is based on available credits (e.g., link layer credits such as link layer credits on the CXL.cache channel) in the upstream direction for the host link 108. To determine this, the bandwidth monitor 320 may track the available upstream credits (e.g., CXL.cache credits). Low available credits indicate that the link 108 is back pressuring due to insufficient available bandwidth. In some embodiments, each channel (e.g., the CXL.cache channel) uses a credit for sending a message and collects a credit return from the receiver of the message (which may return a credit when it has processed the message). By tracking the available credits over a period of time, the bandwidth monitor 320 may estimate an available upstream bandwidth on the host link 108.

The bandwidth availability on a peer-to-peer link 106 to a peer XPU may be determined in any suitable manner, such as any of those described above for the availability on the host link 108 (e.g., based on raw bandwidth utilization or credits available).

The bandwidth availability on the corresponding peer XPU's host link 108 in the upstream direction may be tracked in any suitable manner. In some embodiments, bandwidth monitor 320 may determine this availability based on the rate at which the peer XPU is sending its own host-bound traffic through this XPU. If the peer XPU has ample bandwidth available on its own host link 108, then the peer XPU will not send its host-bound traffic through this XPU (or will send very little traffic through this XPU). If the peer XPU has a low amount of bandwidth available on its own host link 108, it may start sending a fraction of its host-bound requests through one or more peer XPUs. If the XPU detects that a particular peer XPU has ample upstream bandwidth available, then the XPU may send requests through the peer XPU at a reasonable rate. If the XPU detects that a particular peer XPU has a low amount of upstream bandwidth available, then the XPU may send requests at a lower rate. Thus, an XPU may detect the available upstream bandwidth of a peer XPU based on the number of host-bound requests it receives from the peer XPU. In an alternative embodiment, the XPUs 102 could periodically send messages to each other indicating the amount of available bandwidth on their respective host links 108.

Chart 400 depicts an example scheme that may be implemented by request diversion circuitry 322 of an XPU to determine whether to send a host-bound request to a host 104 via the XPU's host link 108 or via a peer XPU. Chart 400 includes various values for an XPU's own upstream available bandwidth on its host link 108, the XPU's peer-to-peer link available bandwidth with a particular peer XPU, and the particular peer XPU's upstream available bandwidth on its host link.

In the chart, an "X" stands for don't care. Thus, when an XPU's own available upstream bandwidth on its host link 108 is high, the XPU does not send host-bound traffic via any of its peer XPUs. If the XPU's own upstream available bandwidth is low, but the available bandwidth on the peer-to-peer link to a peer XPU and on that peer XPU's upstream available bandwidth on its host link 108 is high, then the XPU may send host-bound traffic via the peer XPU at a reasonable rate to increase the bandwidth at which the XPU sends requests to the host. If the XPU's own upstream available bandwidth is low, and either (or both) of the available bandwidth on the peer-to-peer link to a peer XPU or on that peer XPU's upstream available bandwidth on its host link 108 is low, then the XPU may send host-bound traffic via the peer XPU at a very low rate (so as not to overwhelm the other XPU's host link).

In various embodiments, the rate at which an XPU sends host-bound requests through a peer XPU may scale down as the detected available bandwidth of the relevant peer-to-peer link and/or peer XPU's host link drops. In various embodiments, an XPU may track the available bandwidth for each of its peer XPUs and send host-bound requests at different rates for each peer XPU based on the available bandwidths.

Figure 5:
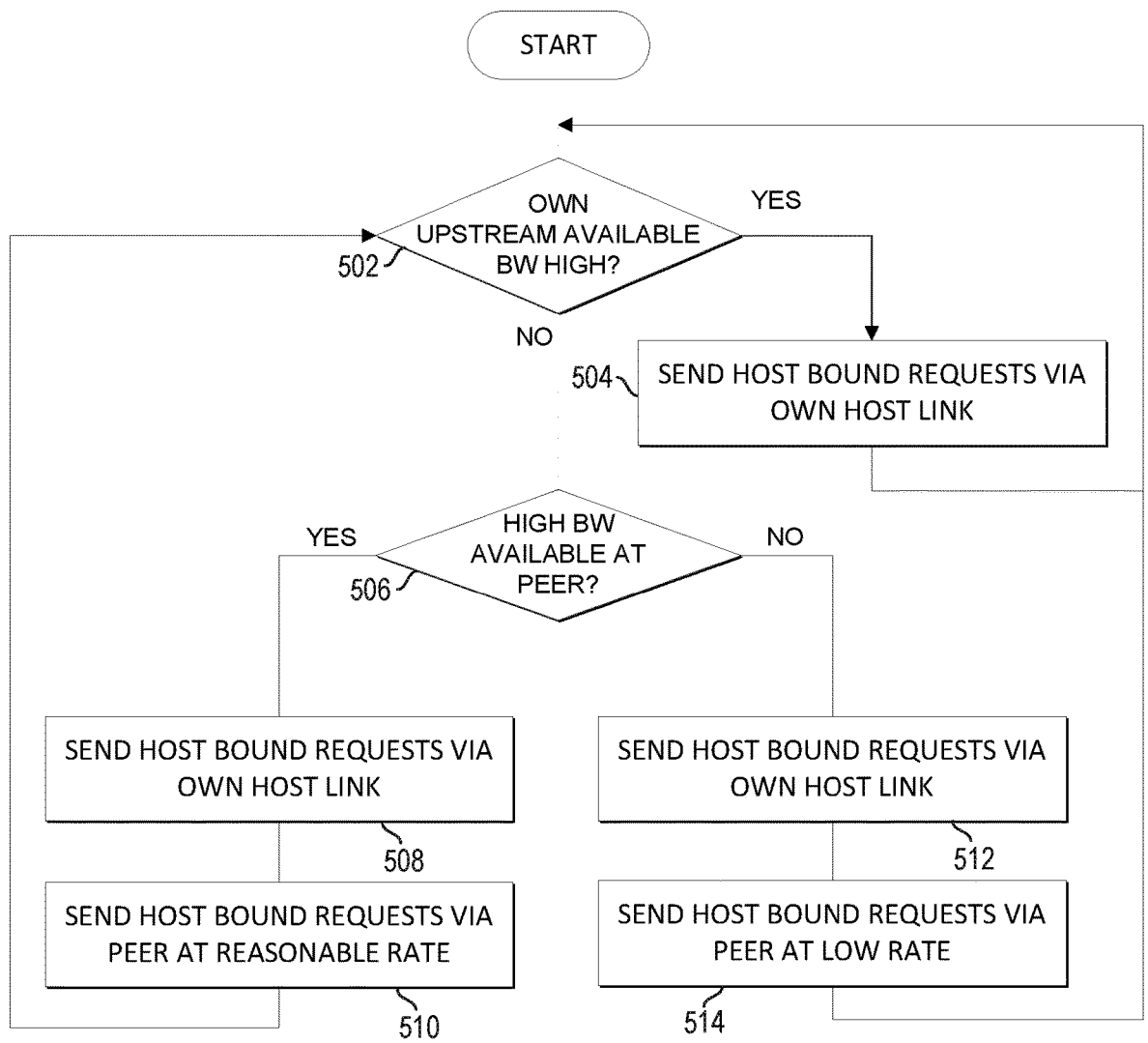
FIG. 5 is a flow for peer-to-peer link sharing for upstream communications from XPUs to a host processor in accordance with various embodiments.

FIG. 5 is a flow for peer-to-peer link sharing for upstream communications from an XPU to a host processor in accordance with various embodiments. The flow begins with a determination of whether upstream available bandwidth of an XPU 102 is high. If the available bandwidth is high, then the XPU may send host-bound requests via a host link 108 of the XPU at 504. As long as the upstream available bandwidth remains high, the XPU may continue sending requests via its own host link. Once a determination is made that the upstream available bandwidth is no longer high, the flow moves to 506.

At 506, a determination is made as to whether a large amount of upstream bandwidth is available at a peer XPU. If yes, then the XPU 102 may send some host-bound requests via its own host link 108 at 508 and other host-bound requests via the peer XPU at a reasonable rate at 510. If high bandwidth is not available at the peer XPU, then the XPU 102 may send some host-bound requests via its own host link 108 at 512 and other host-bound requests via the peer XPU at a low rate at 514. The flow may then return to 502.

In some embodiments, the determination of 506 and the subsequent operations may be performed for each peer XPU. In various embodiments, the XPU may monitor the available upstream bandwidth of multiple peer XPUs and select the peer XPU with the most available upstream bandwidth and send host-bound traffic to the selected peer XPU. The XPU could send host-bound traffic to any number of peer XPUs in any suitable ratios (e.g., based on their available upstream bandwidth). The available bandwidth between the XPU and the peer XPUs may also be used in determining how much host-bound traffic to send to each XPU.

The flows described in the FIGs. herein are merely representative of operations that may occur in particular embodiments. In other embodiments, additional operations may be performed by the components of the various systems described herein. Various embodiments of the present disclosure contemplate any suitable signaling mechanisms for accomplishing the functions described herein. Some of the operations illustrated in the FIGs. may be repeated, combined, modified or deleted where appropriate. Additionally, operations may be performed in any suitable order without departing from the scope of particular embodiments.

Numerous specific details are set forth herein, such as examples of specific types of processors and system configurations, specific hardware structures, and specific architectural and micro architectural details in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Any portion of the systems or components described herein may be included within a device capable of transmitting and/or receiving data. For example, any portion of system 100 may be included in a computing device, such as a host 104 or an XPU 102, either of which may include a processor, system-on-a-chip (SoC), or other suitable circuitry. In some embodiments, a host may comprise any suitable computing system operable to connect to peripheral devices and transmit data to and/or receive data from peripheral devices. A host may comprise one or more processors and one or more ports. A host may comprise or be coupled to any other suitable circuitry, such as memory, interconnect, one or more communication controllers, or other suitable circuitry.

Although the embodiments herein may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from the features described herein. For example, the disclosed embodiments are not limited to particular host devices or peripheral devices, but may apply to any suitable host or peripheral devices such as desktop computer systems, server computer systems, handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations.

Figure 6:
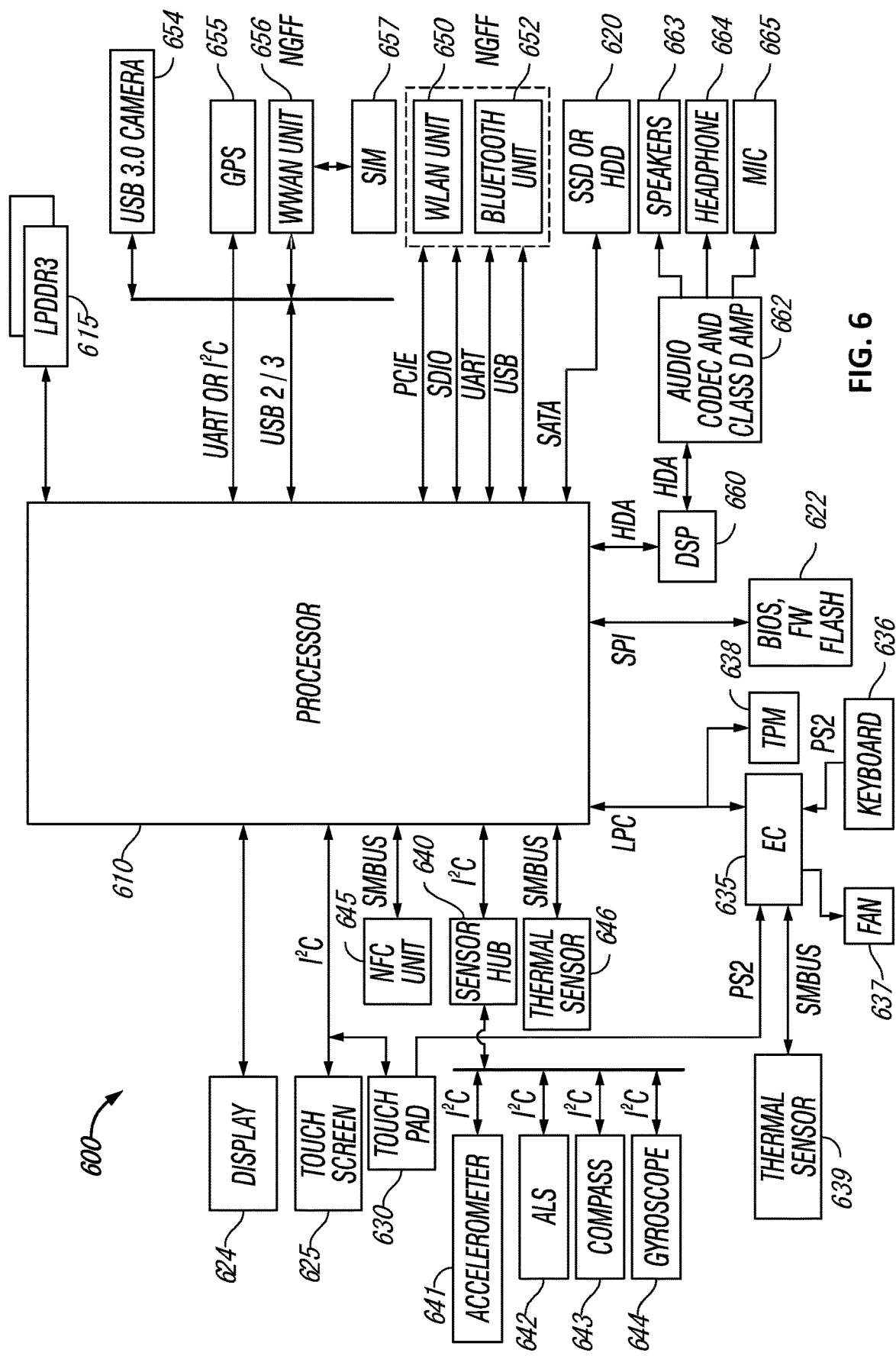
FIG. 6 illustrates a block diagram of components present in a computing system in accordance with various embodiments.
Figure 7:
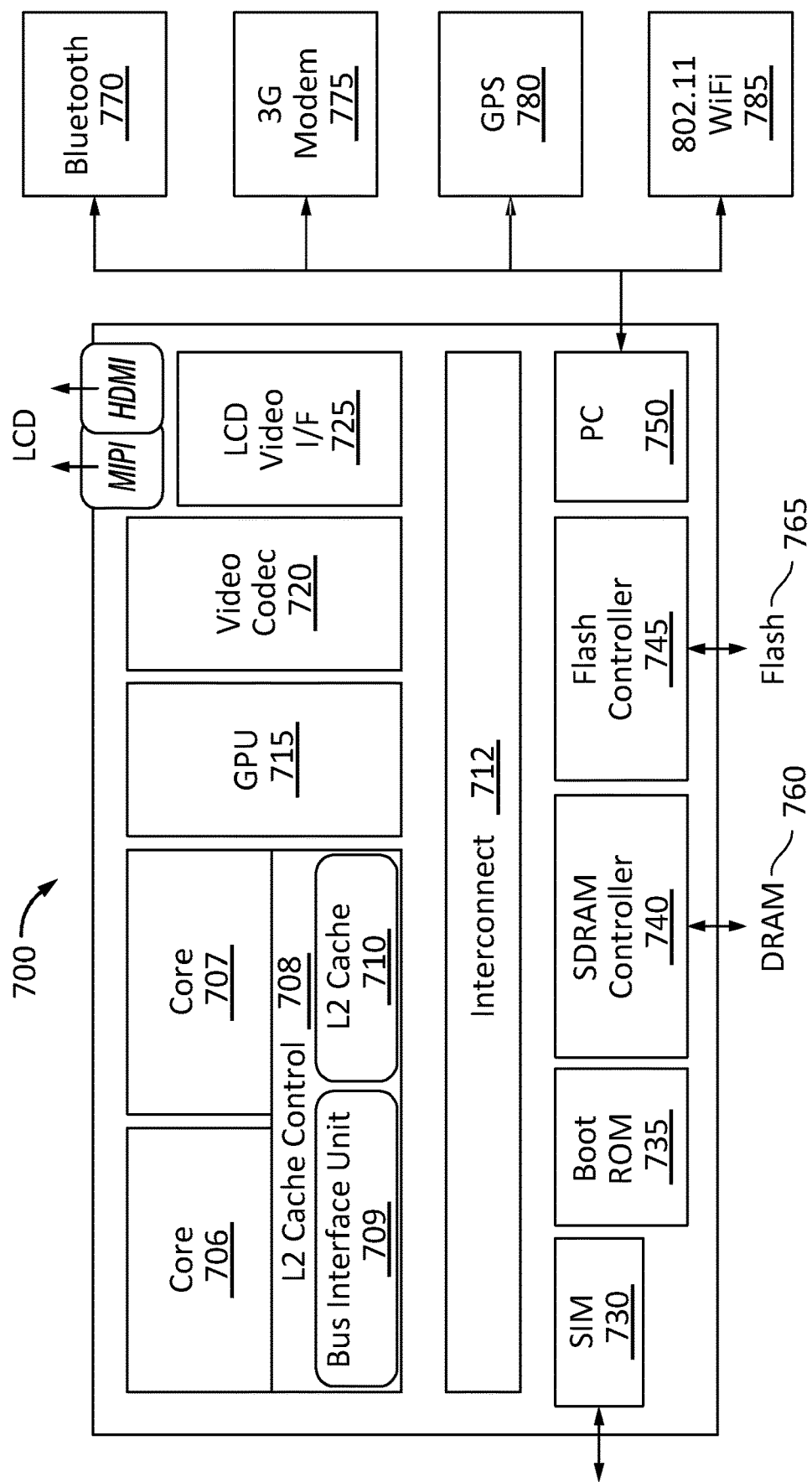
FIG. 7 illustrates a block diagram of another computing system in accordance with various embodiments.

FIGS. 6 and 7 depict example systems in which various embodiments described herein may be implemented. For example, an XPU 102 or a host 104 may comprise any one or more components depicted in FIG. 6 or FIG. 7.

Referring now to FIG. 6, a block diagram of components present in a computer system that may function as either a host 104 or an XPU in accordance with certain embodiments is described. As shown in FIG. 6, system 600 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 6 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 6, a processor 610, in one embodiment, includes a microprocessor, multi-core processor, multi-threaded processor, an ultra low voltage processor, an embedded processor, or other known processing element. In the illustrated implementation, processor 610 acts as a main processing unit and central hub for communication with many of the various components of the system 600. As one example, processor 610 is implemented as a system on a chip (SoC). As a specific illustrative example, processor 610 includes an Intel® Architecture Core™-based processor such as an i3, i5, i7 or another such processor available from Intel Corporation, Santa Clara, CA However, other low power processors such as those available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 610 in one implementation will be discussed further below to provide an illustrative example.

Processor 610, in one embodiment, communicates with a system memory 615. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 620 may also couple to processor 610. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 6, a flash device 622 may be coupled to processor 610, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 600. Specifically shown in the embodiment of FIG. 6 is a display 624 which may be a high definition LCD or LED panel configured within a lid portion of the chassis. This display panel may also provide for a touch screen 625, e.g., adapted externally over the display panel such that via a user's interaction with this touch screen, user inputs can be provided to the system to enable desired operations, e.g., with regard to the display of information, accessing of information and so forth. In one embodiment, display 624 may be coupled to processor 610 via a display interconnect that can be implemented as a high performance graphics interconnect. Touch screen 625 may be coupled to processor 610 via another interconnect, which in an embodiment can be an I2C interconnect. As further shown in FIG. 6, in addition to touch screen 625, user input by way of touch can also occur via a touch pad 630 which may be configured within the chassis and may also be coupled to the same I2C interconnect as touch screen 625.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 610 in different manners. Certain inertial and environmental sensors may couple to processor 610 through a sensor hub 640, e.g., via an I2C interconnect. In the embodiment shown in FIG. 6, these sensors may include an accelerometer 641, an ambient light sensor (ALS) 642, a compass 643 and a gyroscope 644. Other environmental sensors may include one or more thermal sensors 646 which in some embodiments couple to processor 610 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 6, various peripheral devices may couple to processor 610. In the embodiment shown, various components can be coupled through an embedded controller 635. Such components can include a keyboard 636 (e.g., coupled via a PS2 interface), a fan 637, and a thermal sensor 639. In some embodiments, touch pad 630 may also couple to EC 635 via a PS2 interface. In addition, a security processor such as a trusted platform module (TPM) 638 in accordance with the Trusted Computing Group (TCG) TPM Specification Version 1.2, dated Oct. 2, 2003, may also couple to processor 610 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 600 can communicate with external devices in a variety of manners, including wirelessly. In the embodiment shown in FIG. 6, various wireless modules, each of which can correspond to a radio configured for a particular wireless communication protocol, are present. One manner for wireless communication in a short range such as a near field may be via a near field communication (NFC) unit 645 which may communicate, in one embodiment with processor 610 via an SMBus. Note that via this NFC unit 645, devices in close proximity to each other can communicate. For example, a user can enable system 600 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 6, additional wireless units can include other short range wireless engines including a WLAN unit 650 and a Bluetooth unit 652. Using WLAN unit 650, Wi-Fi™ communications in accordance with a given Institute of Electrical and Electronics Engineers (IEEE) 802.11 standard can be realized, while via Bluetooth unit 652, short range communications via a Bluetooth protocol can occur. These units may communicate with processor 610 via, e.g., a USB link or a universal asynchronous receiver transmitter (UART) link. Or these units may couple to processor 610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 656 which in turn may couple to a subscriber identity module (SIM) 657. In addition, to enable receipt and use of location information, a GPS module 655 may also be present. Note that in the embodiment shown in FIG. 6, WWAN unit 656 and an integrated capture device such as a camera module 654 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 660, which may couple to processor 610 via a high definition audio (HDA) link. Similarly, DSP 660 may communicate with an integrated coder/decoder (CODEC) and amplifier 662 that in turn may couple to output speakers 663 which may be implemented within the chassis. Similarly, amplifier and CODEC 662 can be coupled to receive audio inputs from a microphone 665 which in an embodiment can be implemented via dual array microphones (such as a digital microphone array) to provide for high quality audio inputs to enable voice-activated control of various operations within the system. Note also that audio outputs can be provided from amplifier/CODEC 662 to a headphone jack 664. Although shown with these particular components in the embodiment of FIG. 6, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 610 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Turning next to FIG. 7, another block diagram for an example computing system that may serve as a host 104 or XPU 102 in accordance with certain embodiments is shown. As a specific illustrative example, SoC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 712 includes an on-chip interconnect, such as an IOSF, AMBA, or other interconnect discussed above, which potentially implements one or more aspects of the described disclosure.

Interconnect 712 provides communication channels to the other components, such as a Subscriber Identity Module (SIM) 730 to interface with a SIM card, a boot rom 735 to hold boot code for execution by cores 706 and 707 to initialize and boot SoC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

In addition, the system illustrates peripherals for communication, such as a Bluetooth module 770, 3G modem 775, GPS 780, and WiFi 785. Note as stated above, a UE includes a radio for communication. As a result, these peripheral communication modules are not all required. However, in a UE some form of a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 710 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any non-transitory mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; or other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Example 1 includes a processor unit comprising a first controller to couple to a host processing unit over a first link;

a second controller to couple to a second processor unit over a second link, wherein the second processor unit is to couple to the host processing unit via a third link; and circuitry to determine whether to send a cache coherent request to the host processing unit over the first link or over the second link via the second processing unit.

Example 2 includes the subject matter of Example 1, and wherein the first link and the third link are each links according to a Compute Express Link protocol.

Example 3 includes the subject matter of any of Examples 1 and 2, and wherein the circuitry is to determine whether to send the cache coherent request over the first link or over the second link based on an amount of available upstream bandwidth over the first link.

Example 4 includes the subject matter of any of Examples 1-3, and wherein the circuitry is to determine the amount of available upstream bandwidth over the first link based on a number of link credits available.

Example 5 includes the subject matter of any of Examples 1-4, and wherein the circuitry is to determine the amount of available upstream bandwidth over the first link based on a raw upstream bandwidth metric.

Example 6 includes the subject matter of any of Examples 1-5, and wherein the circuitry is to determine whether to send the cache coherent request over the first link or over the second link based on an amount of available bandwidth over the second link.

Example 7 includes the subject matter of any of Examples 1-6, and wherein the circuitry is to determine whether to send the cache coherent request over the first link or over the second link based on an amount of available upstream bandwidth over the third link.

Example 8 includes the subject matter of any of Examples 1-7, and wherein the circuitry is to determine the amount of available upstream bandwidth over the third link based on a number of host-bound requests received by the processor unit from the second processing unit, wherein the processor unit is to send the host-bound requests to the host processing unit over the first link.

Example 9 includes the subject matter of any of Examples 1-8, and further including second circuitry to track memory requests received from the second processor unit for memory of the host processing unit; and respond to snoop requests associated with such memory from the host processing unit.

Example 10 includes the subject matter of any of Examples 1-9, wherein the processor unit and the second processor unit are each graphics processing units.

Example 11 includes a method comprising communicating, by a first processor unit, with a host processing unit over a first link; communicating, by the first processor unit, with a second processor unit over a second link, wherein the second processor unit is to couple to the host processing unit via a third link; and determining whether to send a cache coherent request to the host processing unit over the first link or over the second link via the second processing unit.

Example 12 includes the subject matter of Example 11, and wherein the first link and the third link are each links according to a Compute Express Link protocol.

Example 13 includes the subject matter of any of Examples 11 and 12, and further including determining whether to send the cache coherent request over the first link or over the second link based on an amount of available upstream bandwidth over the first link.

Example 14 includes the subject matter of any of Examples 11-13, and further including determining the amount of available upstream bandwidth over the first link based on a number of link credits available.

Example 15 includes the subject matter of any of Examples 11-14, and further including determining the amount of available upstream bandwidth over the first link based on a raw upstream bandwidth metric.

Example 16 includes the subject matter of any of Examples 11-15, and further including determining whether to send the cache coherent request over the first link or over the second link based on an amount of available bandwidth over the second link.

Example 17 includes the subject matter of any of Examples 11-16, and further including determining whether to send the cache coherent request over the first link or over the second link based on an amount of available upstream bandwidth over the third link.

Example 18 includes the subject matter of any of Examples 11-17, and further including determining the amount of available upstream bandwidth over the third link based on a number of host-bound requests received by the processor unit from the second processing unit, wherein the processor unit is to send the host-bound requests to the host processing unit over the first link.

Example 19 includes the subject matter of any of Examples 11-18, and further including tracking memory requests received from the second processor unit for memory of the host processing unit; and responding to snoop requests associated with such memory from the host processing unit.

Example 20 includes the subject matter of any of Examples 11-19, and wherein the processor unit and the second processor unit are each graphics processing units.

Example 21 includes a system comprising a host processor unit; and a plurality of processor units, a processor unit of the plurality of processor units coupled to the host processor unit via a first link and to other processor units of the plurality of processor units via a plurality of second links, the other processor units coupled to the host processor unit via a plurality of third links; and wherein the processor unit is to determine whether to send a cache coherent request to the host processing unit over the first link or over one of the second links via one of the other processing units.

Example 22 includes the subject matter of Example 21, and wherein the first link and the third link are each links according to a Compute Express Link protocol.

Example 23 includes the subject matter of any of Examples 21 and 22, and wherein the processor unit is to determine whether to send the cache coherent request over the first link or over one of the second links based on an amount of available upstream bandwidth over the first link.

Example 24 includes the subject matter of any of Examples 21-23, and wherein the processor unit is to determine the amount of available upstream bandwidth over the first link based on a number of link credits available.

Example 25 includes the subject matter of any of Examples 21-24, and wherein the processor unit is to determine the amount of available upstream bandwidth over the first link based on a raw upstream bandwidth metric.

Example 26 includes the subject matter of any of Examples 21-25, and wherein the processor unit is to determine whether to send the cache coherent request over the first link or over one of the second links based on an amount of available upstream bandwidths over the second links.

Example 27 includes the subject matter of any of Examples 21-26, and wherein the processor unit is to determine whether to send the cache coherent request over the first link or over the second link based on an amount of available upstream bandwidths over the plurality of third links.

Example 28 includes the subject matter of any of Examples 21-27, and wherein the processor unit is to determine the amount of available upstream bandwidth over the third links based on a number of host-bound requests received by the processor unit from the second processing units, wherein the processor unit is to send the host-bound requests to the host processing unit over the first link.

Example 29 includes the subject matter of any of Examples 21-28, and wherein the processor unit is to send a plurality of cache coherent requests to the host processor unit via a first plurality of the other processor units.

Example 30 includes the subject matter of any of Examples 21-29, and wherein the processor unit is to track memory requests received from a second processor unit of the plurality of processor units, the memory requests for memory of the host processing unit; and respond to snoop requests associated with such memory from the host processing unit.

Example 31 includes the subject matter of any of Examples 21-30, and wherein the processor unit and the second processor units are each graphics processing units.

Example 32 includes the subject matter of any of Examples 21-31, and wherein the processor unit is to track memory requests received from a second processor unit of the plurality of processor units, the memory requests for memory of the host processing unit; and respond to snoop requests associated with such memory from the host processing unit.

Example 33 includes at least one non-transitory machine accessible storage medium having instructions stored thereon, the instructions when executed on a machine, cause the machine to perform the method of any of Examples 11-20.

Example 34 includes a system comprising means to perform the method of any of Examples 11-20.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor unit comprising:
    a first controller to couple to a host processor unit over a first link;
    a second controller to couple to a second processor unit over a second link, wherein the second processor unit is to couple to the host processor unit via a third link; and
    circuitry to determine whether to send a cache coherent request to the host processor unit over the first link or over the second link via the second processor unit.

2. The processor unit of claim 1, wherein the first link and the third link are each links according to a Compute Express Link protocol.

3. The processor unit of claim 1, wherein the circuitry is to determine whether to send the cache coherent request over the first link or over the second link based on an amount of available upstream bandwidth over the first link.

4. The processor unit of claim 3, wherein the circuitry is to determine the amount of available upstream bandwidth over the first link based on a number of link credits available.

5. The processor unit of claim 3, wherein the circuitry is to determine the amount of available upstream bandwidth over the first link based on a raw upstream bandwidth metric.

6. The processor unit of claim 1, wherein the circuitry is to determine whether to send the cache coherent request over the first link or over the second link based on an amount of available bandwidth over the second link.

7. The processor unit of claim 1, wherein the circuitry is to determine whether to send the cache coherent request over the first link or over the second link based on an amount of available upstream bandwidth over the third link.

8. The processor unit of claim 7, wherein the circuitry is to determine the amount of available upstream bandwidth over the third link based on a number of host-bound requests received by the processor unit from the second processor unit, wherein the processor unit is to send the host-bound requests to the host processor unit over the first link.

9. The processor unit of claim 1, further comprising second circuitry to:
    track memory requests received from the second processor unit for memory of the host processor unit; and
    respond to snoop requests associated with such memory from the host processor unit.

10. The processor unit of claim 1, wherein the processor unit and the second processor unit are each graphics processing units.

11. A method comprising:
    communicating, by a first processor unit, with a host processor unit over a first link;
    communicating, by the first processor unit, with a second processor unit over a second link, wherein the second processor unit is to couple to the host processor unit via a third link; and
    determining whether to send a cache coherent request to the host processor unit over the first link or over the second link via the second processor unit.

12. The method of claim 11, further comprising determining whether to send the cache coherent request over the first link or over the second link based on an amount of available upstream bandwidth over the first link.

13. The method of claim 11, further comprising determining whether to send the cache coherent request over the first link or over the second link based on an amount of available bandwidth over the second link.

14. The method of claim 11, further comprising determining whether to send the cache coherent request over the first link or over the second link based on an amount of available upstream bandwidth over the third link.

15. The method of claim 11, further comprising:
    tracking memory requests received from the second processor unit for memory of the host processor unit; and
    responding to snoop requests associated with such memory from the host processor unit.

16. A system comprising:
    a host processor unit; and
    a plurality of processor units, a processor unit of the plurality of processor units coupled to the host processor unit via a first link and to other processor units of the plurality of processor units via a plurality of second links, the other processor units coupled to the host processor unit via a plurality of third links;

wherein the processor unit is to determine whether to send a cache coherent request to the host processor unit over the first link or over one of the second links via one of the other processor units.

17. The system of claim 16, wherein the processor unit is to determine whether to send the cache coherent request over the first link or over one of the second links based on an amount of available upstream bandwidth over the first link.

18. The system of claim 16, wherein the processor unit is to determine whether to send the cache coherent request over the first link or over one of the second links based on an amount of available upstream bandwidths over the second links.

19. The system of claim 16, wherein the processor unit is to send a plurality of cache coherent requests to the host processor unit via a first plurality of the other processor units.

20. The system of claim 16, wherein the processor unit is to:
   track memory requests received from a second processor unit of the plurality of processor units, the memory requests for memory of the host processor unit; and
   respond to snoop requests associated with such memory from the host processor unit.

\* \* \* \* \*